(12) United States Patent
Peavler

(10) Patent No.: US 6,361,023 B1
(45) Date of Patent: Mar. 26, 2002

(54) TRAILER JACKING DEVICE

(76) Inventor: Derrick C. Peavler, 357 E. 200 North, Green River, WY (US) 82935

( * ) Notice: Subject to any disclaimer, the term of this patent is extended or adjusted under 35 U.S.C. 154(b) by 0 days.

(21) Appl. No.: 09/505,928

(22) Filed: Feb. 14, 2000

Related U.S. Application Data

(63) Continuation-in-part of application No. 09/037,838, filed on Mar. 10, 1998, now Pat. No. 6,062,545.

(51) Int. Cl.$^7$ .................................................. B66F 3/00
(52) U.S. Cl. ........................ 254/424; 254/134; 254/420
(58) Field of Search ................................ 254/418, 419, 254/420, 423, 424, 425, 45, 86 R; 280/475; 248/289.1; 74/527; 403/376, 355, 324

(56) References Cited

U.S. PATENT DOCUMENTS

| | | | | |
|---|---|---|---|---|
| 3,802,664 A | * | 4/1974 | Edwards | ..................... 254/134 |
| 3,863,894 A | * | 2/1975 | Mansi et al. | ................. 254/420 |
| 4,424,983 A | * | 1/1984 | Walters | ..................... 254/420 |
| 5,011,119 A | * | 4/1991 | Harrington | ................... 254/420 |
| 6,042,074 A | * | 3/2000 | Cusimano | ................... 254/424 |

* cited by examiner

Primary Examiner—Derris H. Banks
Assistant Examiner—Daniel Shanley
(74) Attorney, Agent, or Firm—Mallinckrodt & Mallinckrodt; Brian R. Rayve

(57) ABSTRACT

Trailer jack attachment assemblies which do not extend below the lowermost frame member of the trailer body so as to avoid increasing obstruction from roads and rough terrain. Attachment is made to the trailer frame without destroying its structural integrity. Cross-braces between laterally opposite attachments minimize localized twisting of individual frame members.

12 Claims, 7 Drawing Sheets

TRAILER JACKING DEVICE

Related Application

Figure 1:
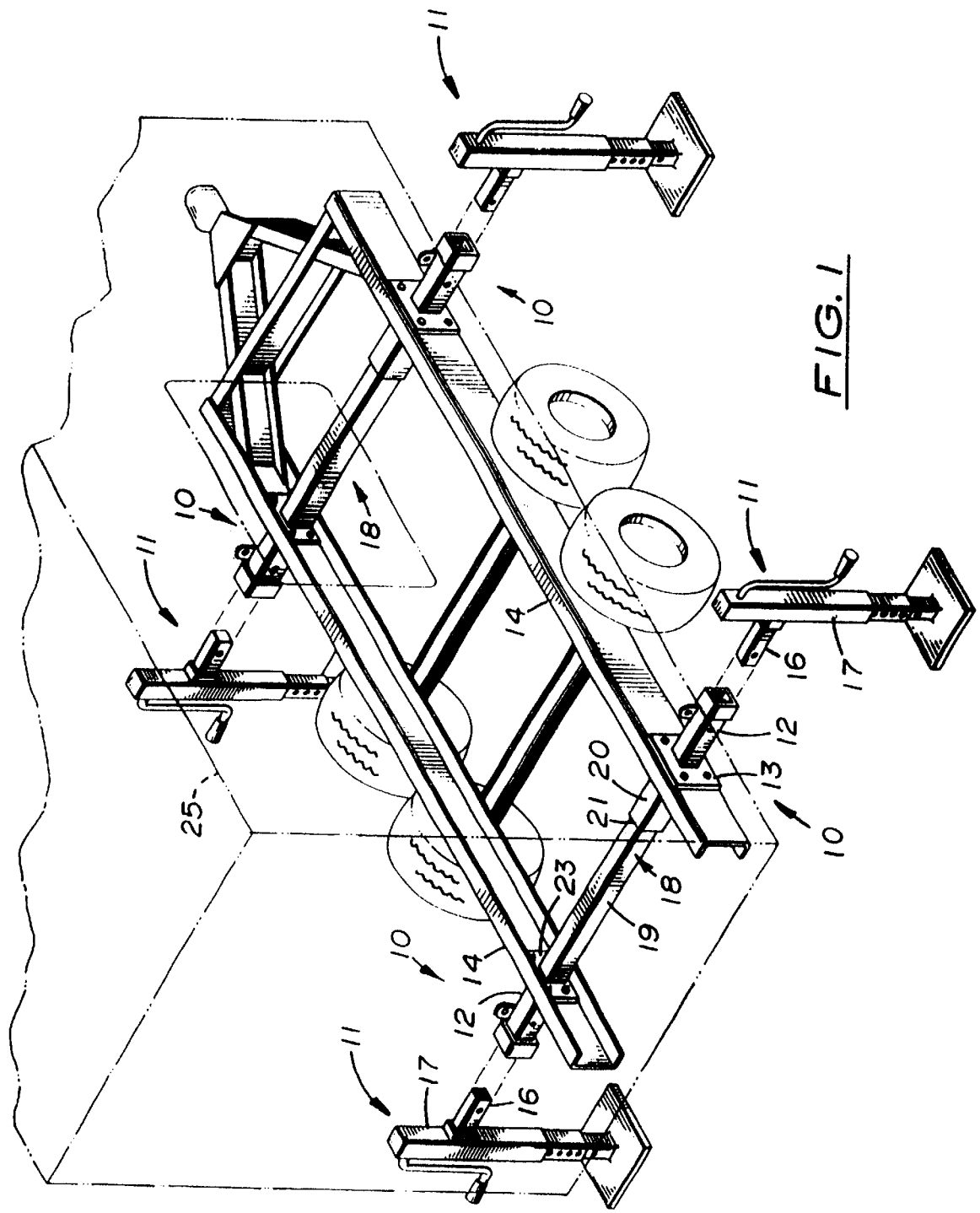

This application is a continuation-in-part of my U.S. application Ser. No. 09/037,838 filed Mar. 10, 1998, now U.S. Pat No. 6,062,545.

BACKGROUND OF THE INVENTION

1. Field

The field of the invention is devices for leveling the bodies of vehicle drawn trailers when parked.

2. State of the Art

A recurrent problem in the use of vehicle drawn trailers is parking upon uneven ground, wherein the trailer tends to repose into a tilted position if allowed to rest upon its wheels. Often, standard axle jacks do not easily lift the trailer sufficiently to level the trailer. Even then, chocks or the like must be placed to support both wheel ends of the axles for parking. Several auxiliary devices have been proposed wherein a jack engageable member is secured to the trailer frame to extend laterally for purchase of jacks beside, rather than beneath, the trailer body. In U.S. Pat. No. 3,802,664, a crossbar is secured to side members of the trailer frame to extend beyond the outside trailer walls to provide a vertical jacking plate. The latter is engaged by a conventional automobile bumper jack. One serious shortcoming is that crossbar can only be secured below the frame members so that it projects downwardly, which is particularly vulnerable to dragging against the ground of rough roads and driveways. With this device, the bumper jack's grasp upon the plates is tenuous at best, with no positive lock between jack and plate.

Clearly, a need remains for a trailer attached apparatus for jacking the trailer to a laterally and longitudinally level position when parked on sloping and uneven ground.

SUMMARY OF THE INVENTION

With the foregoing in mind, the shortcomings in the prior art trailer jacking devices are eliminated or substantially alleviated by the present invention, which provides at least one jack attachment assembly secured to a lowermost longitudinal member of a trailer body frame, preferably without extending below the plane of the bottom of such members. This avoids creating any additional obstruction to the use of the trailer on uneven roads and terrains. A jack attachment member extends horizontally beyond the associated trailer sidewall to there fit about a lifting member of a trailer jacking device or jack. Preferably, this jack lifting member extends horizontally inwardly, firmly secured such as by welding to the moving outer shell or housing of the jack, and telescopically joins the outwardly extending jack attachment member. This virtually eliminates the possibility of the trailer becoming disengaged from the jack during use.

Preferably, a forward and a rearward pair of jack attachment assemblies are used, each comprising a pair of horizontal tubular members each with an affixed vertical attachment flange at an innermost end connecting with and bolted to a respective trailer body frame longitudinal member. To relieve any localized twisting force upon the trailer body frame members from the jacking force, preferably an end flanged cross-brace joins the jack attachment members of each pair, the end flanges each being bolted to the respective attachment flanges through a respective trailer body frame longitudinal member. Each cross-brace may comprise a monolithic beam-like member, or slideably associated segments rigidly secured together to span between the trailer body frame longitudinal members.

The jack attachment assemblies and cross-brace, therefore, t; provide a substantially stronger and more rigid support of the trailer body in jacked up position than is provided by any of the prior art methods and apparatus for this purpose.

THE DRAWINGS

Figure 4:
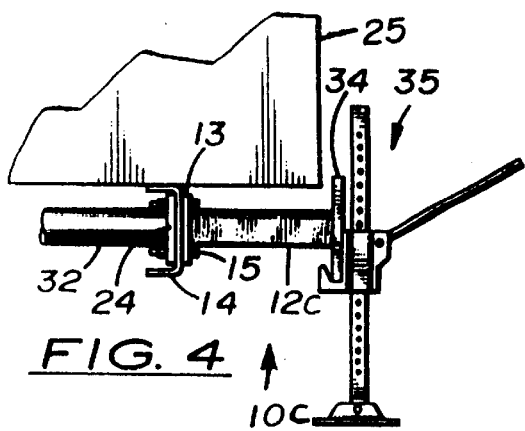
Figure 3:
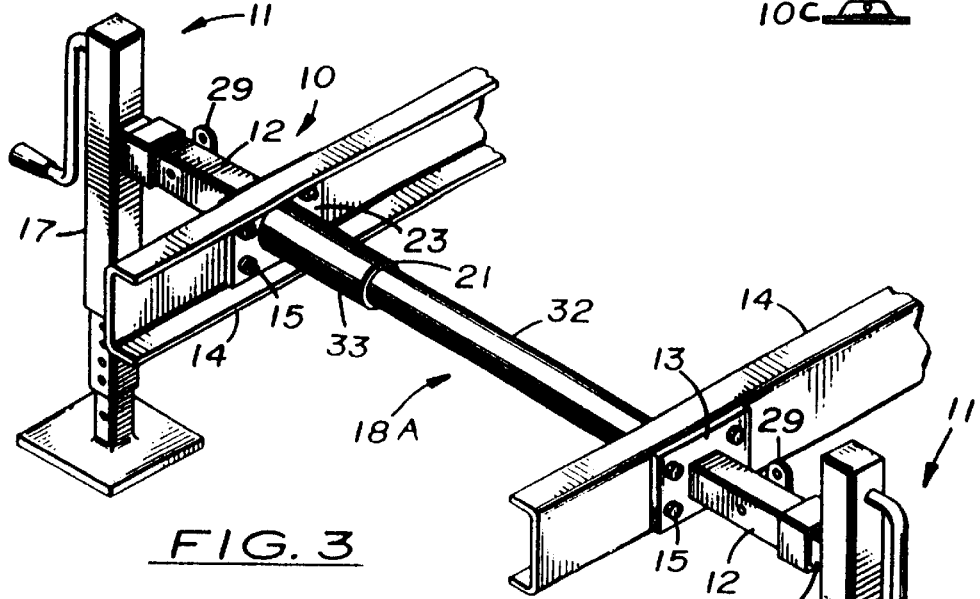
Figure 2:
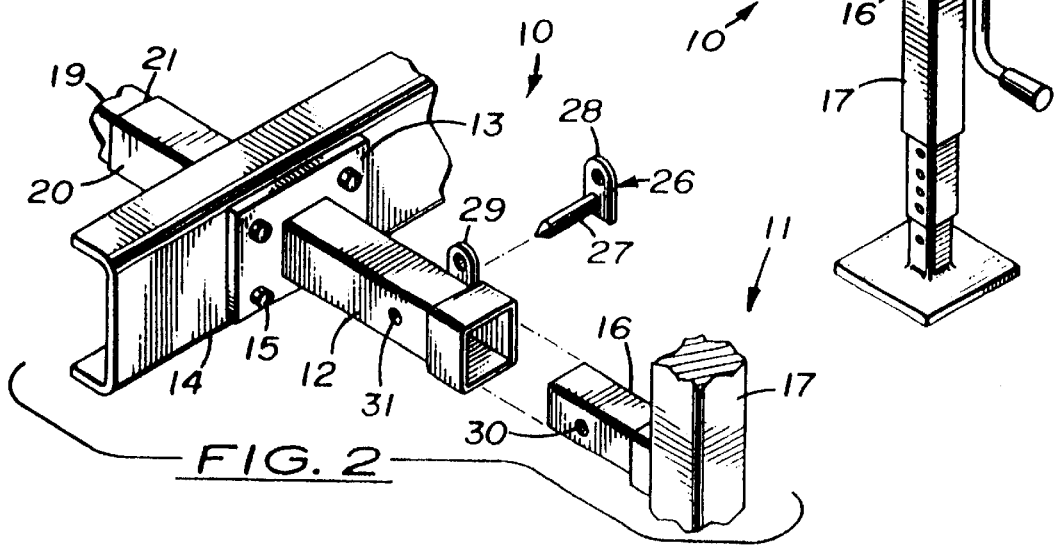
Figure 5:
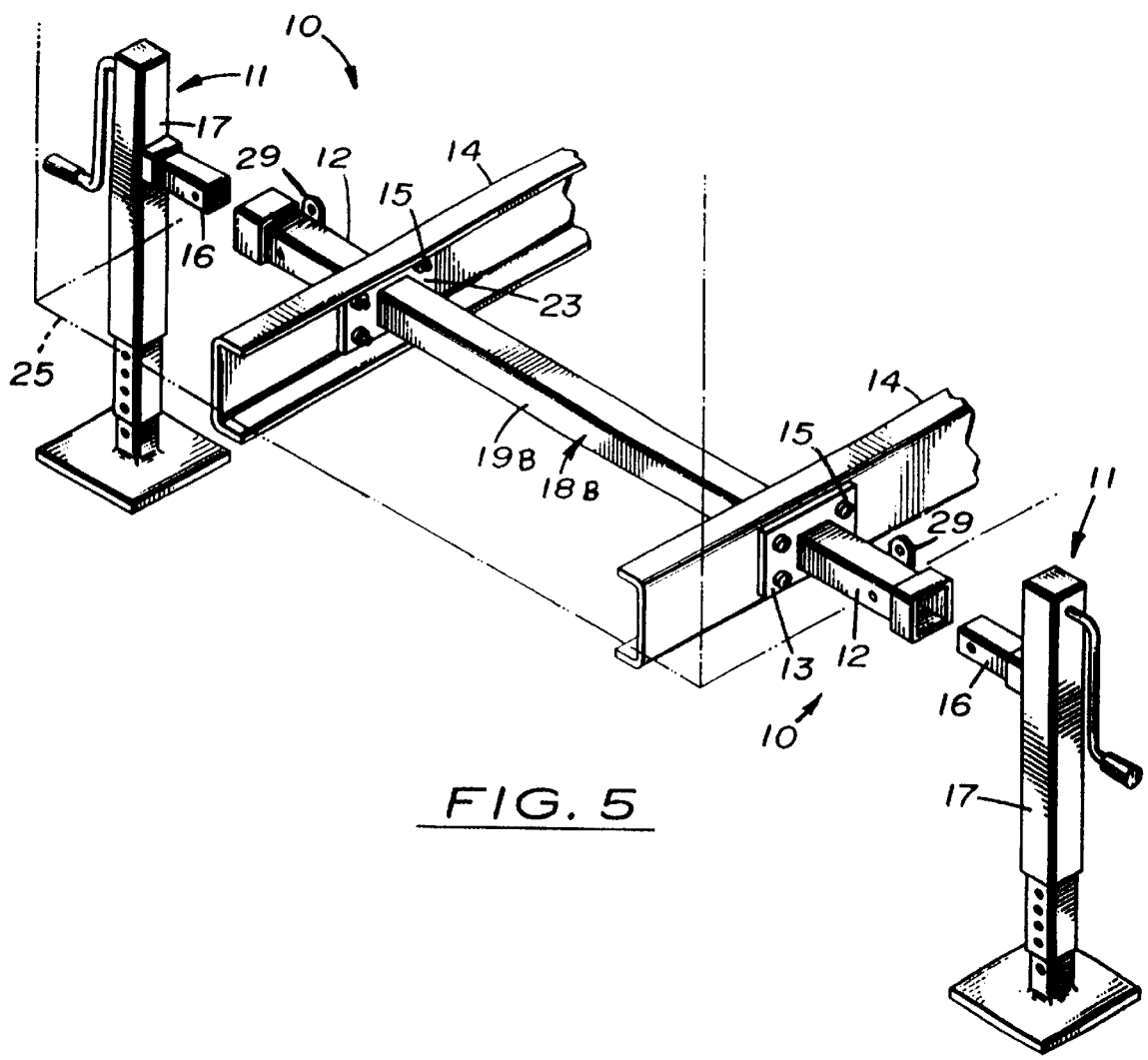
Figure 6:
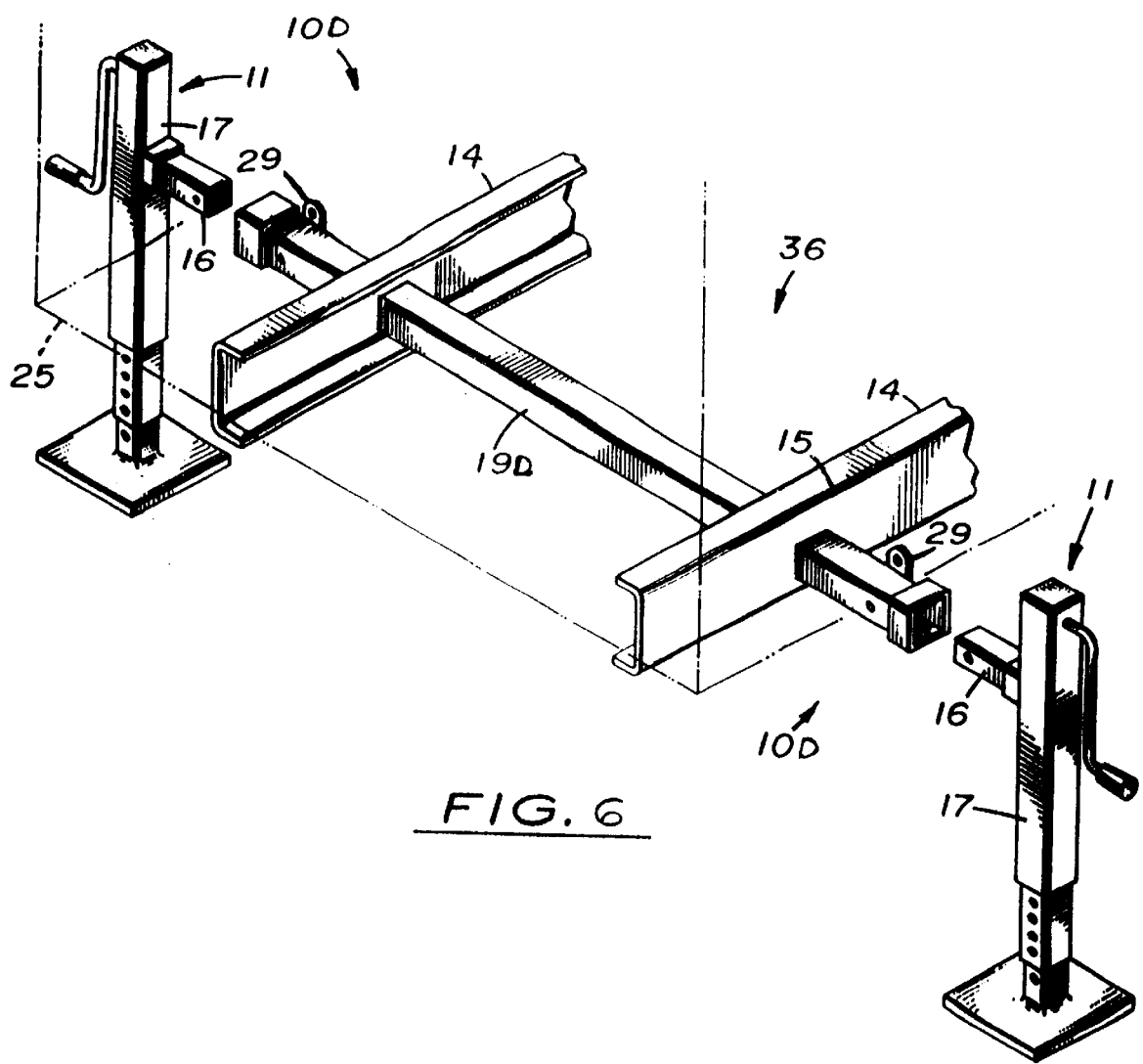
Figure 7:
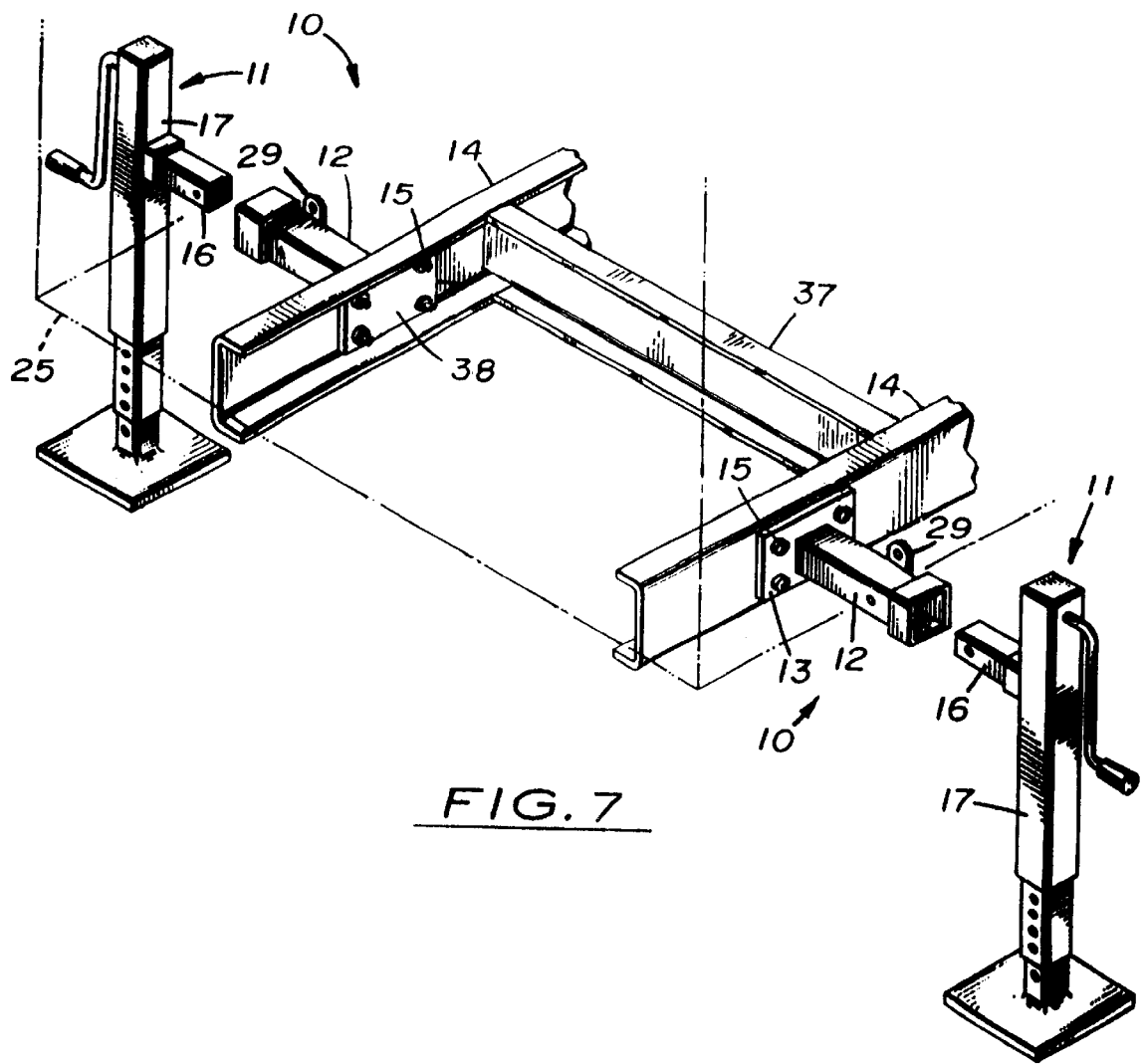
Figure 8:
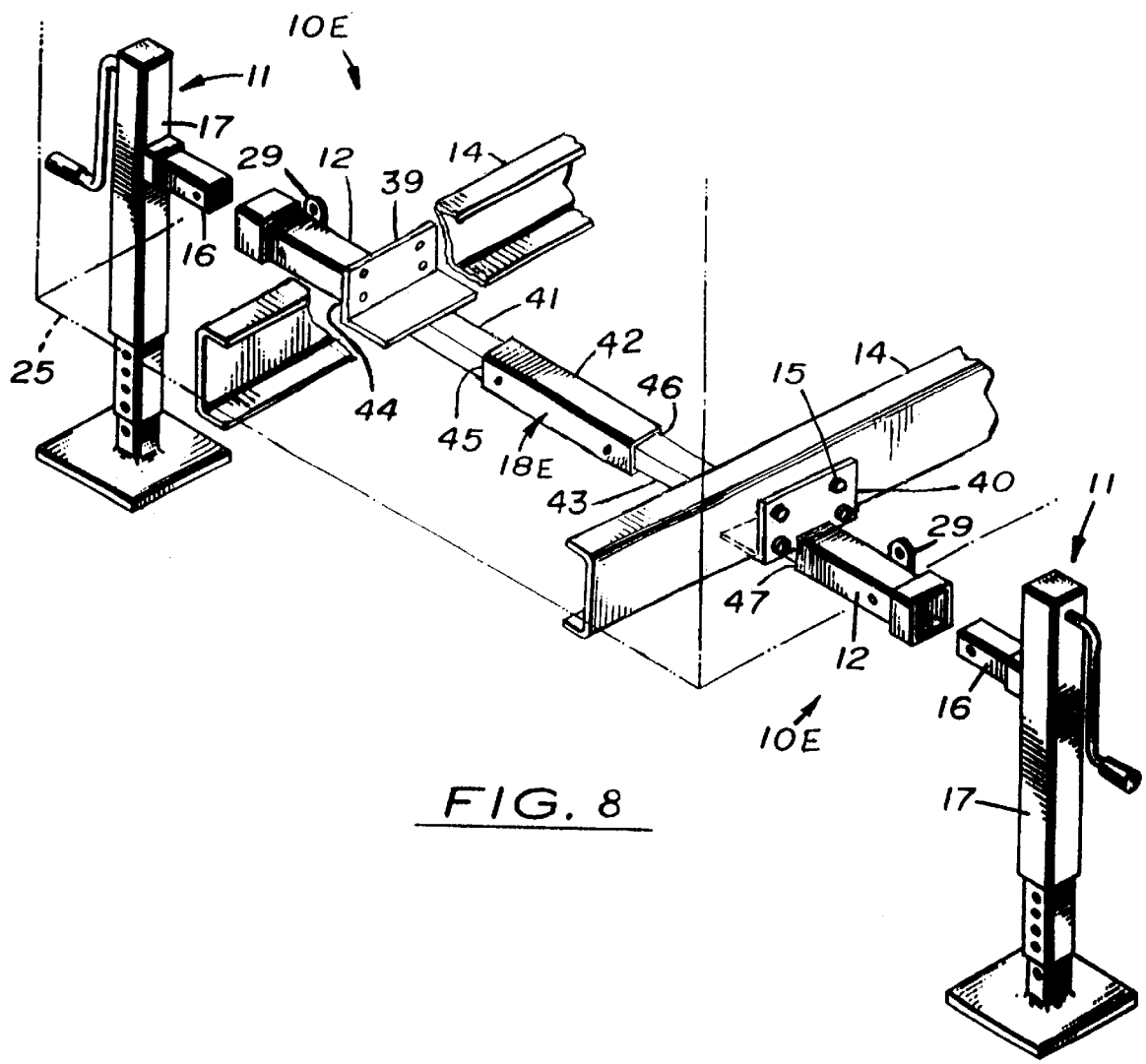
Figure 9:
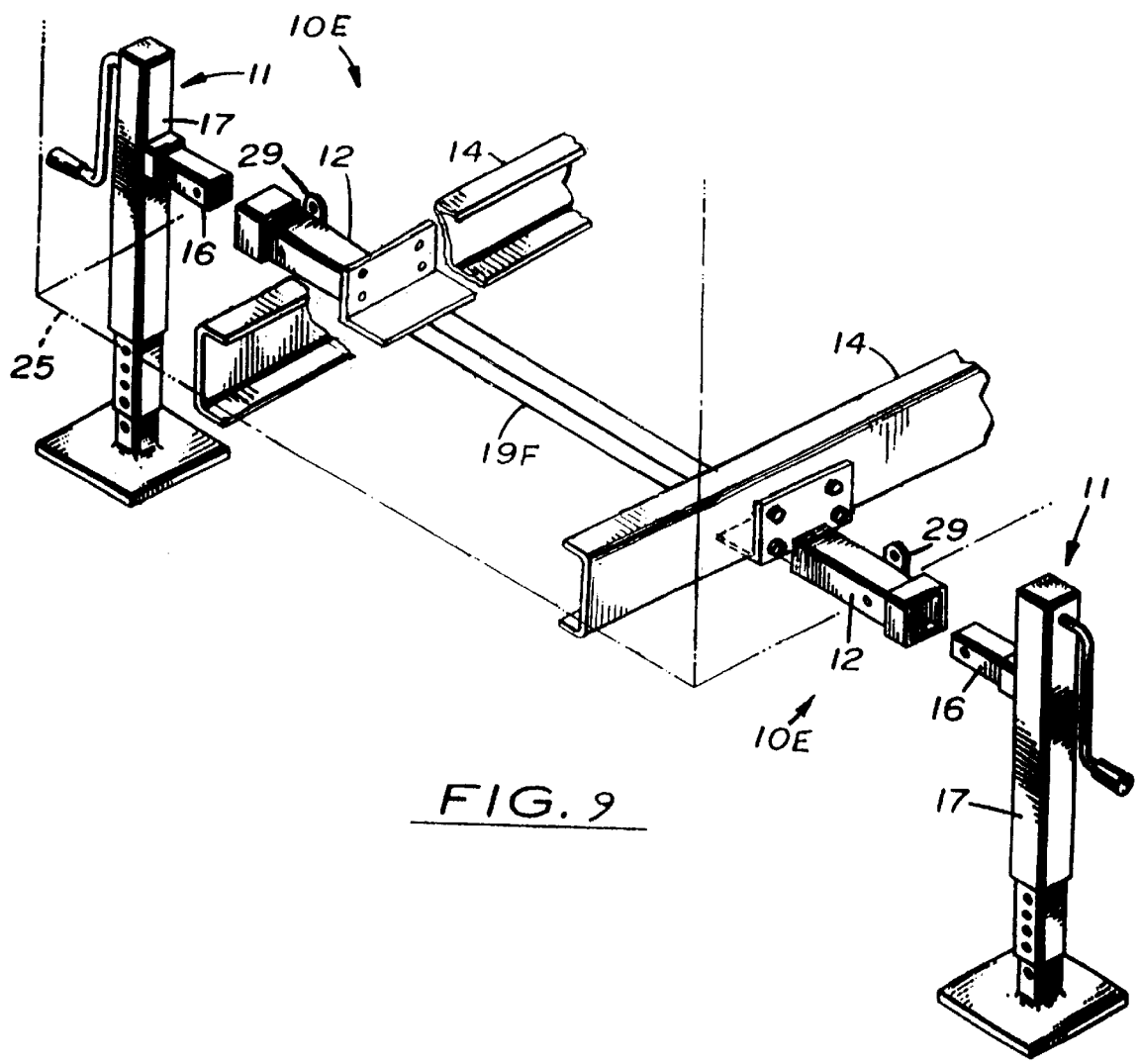

The best mode presently contemplated for carrying out the invention is illustrated in the accompanying drawings, in which:

FIG. 1 is a perspective view of the frame of a trailer body with the jack attachment assemblies, showing four jacks in position for engagement of the jack attachment members;

FIG. 2, a perspective view of a fragment of one of the trailer body frame longitudinal members with a fragment of the jack lifting member and associated jack, showing locking provisions to prevent inadvertent disengagement of the jack from the trailer body;

FIG. 3, a perspective view of a fragment of the trailer body frame, showing the attachment of the jacks and an end flanged cross brace of circular tubing;

FIG. 4, a rear view of a fragment of the trailer body frame, showing a jack attachment assembly adapted for use of a standard bumper jack;

FIG. 5, a perspective view corresponding to FIG. 1, of a fragment thereof which incorporates a monolithic cross-brace;

FIG. 6, a perspective view corresponding to FIG. 1, of a fragment thereof which incorporates a monolithic cross-brace with integral tubular members;

FIG. 7, a perspective view corresponding to FIG. 1, of a fragment thereof which utilizes a cross-brace of the trailer rather than a separate cross-brace;

FIG. 8, a perspective view corresponding to FIG. 1, of a fragment thereof partially broken which utilizes alternate jack attachment assemblies and a three piece telescoping cross-brace; and FIG. 9, a perspective view corresponding to FIG. 8 which incorporates a monolithic cross-brace.

DETAILED DESCRIPTION OF THE ILLUSTRATED EMBODIMENTS

Front and rear pairs of jack attachment assemblies 10 provide for connection of lifting jacks 11 through respective jack attachment members or horizontal tubular members 12 welded to attachment flange members 13 in turn secured to trailer body frame channels or longitudinal members 14 by bolts 15. A smaller lifting member or tubular member 16 welded to each of outer housings 17 of the jacks 11 telescopically engages the tubular member 12 of the associated jack attachment assembly 10. (FIGS. 1 and 2).

A cross-brace assembly 18 resists local twisting of individual longitudinal members 14, and includes telescoped box beam segments 19 and 20, which are rigidly joined as by a weld 21 after installation. (FIGS. 1 and 2). A pair of cross-brace assembly end flanges 23 and 24 of cross-brace assembly 18, jack attachment assembly attachment flange members 13, and longitudinal members 14 are secured together by bolts 15 installed through matching holes, not shown.

Horizontal tubular members 12, when joined by the inserted tubular members 16, provide very reliable connection to trailer body 25. However, a locking pin assembly 26 may be provided, comprising a locking pin 27 with tab 28, and a tab 29 welded to jack attachment assembly tubular member 12. Matching locking pin bores 30 and 31 in tubular member 16 and tubular member 12, respectively, receive locking pin 27 to securely join jack 11 to trailer body frame longitudinal member 14, as indicated in exploded view in FIG. 2 such as by bolting tab 28 to tab 29.

The illustrated and described embodiment of jack attachment assembly 10 may be variously altered without departing from the spirit of the invention. For example, box beam segments 19 and 20 of cross-brace assembly 18 (FIGS. 1 and 2) may be replaced by telescoping pipe segments 32 and 33 to comprise a cross-brace assembly 18A (FIG. 3) or by a single beam segment 19B to comprise a cross-brace assembly 18B. (FIG. 5). Likewise, the outer end of a tubular member 12C having no tab 29 and hole 31 may carry a vertical plate 34, to permit use of a standard bumper jack 35. (FIG. 4). However, the lower edge of vertical plate 34 preferably does not extend below the plane of the bottom of the trailer body frame longitudinal members 14.

For further example, box beam segments 19 and 20 of cross-brace assembly 18 and horizontal members 12 of jack attachment assemblies 10 (FIGS. 1 and 2) may be replaced by a single box beam segment 19D to comprise an integral cross-brace jack attachment assembly 36 which extends through respective holes, not shown, and which is welded to respective longitudinal members 14 with ends thereof including tabs 29 comprising respective jack attachment assemblies 10D. (FIG. 6). Also, box beam segments 19 and 20 of cross-brace assembly 18 (FIGS. 1 and 2) may be eliminated altogether and replaced by a standard trailer body frame cross-member 37 interconnecting longitudinal members 14, with a pair of backer plates 38 providing support thereto for the attachment of tubular members 12 by means of attachment flange members 13. (FIG. 7). Likewise, jack attachment assemblies 10 can be replaced by jack attachment assemblies 10E which comprise tubular members 12 welded to attachment angle members 39 and 40 in turn secured to longitudinal members 14 by bolts 15. A cross-brace assembly 18E resists local twisting of longitudinal members 14, which comprises telescoped box beam segments 41, 42, and 43, which are rigidly joined as by welds 44, 45, 46, and 47 or by thru-bolts (not shown) after installation. (FIG. 8). Attachment angle members 39 and 40 of jack attachment assembly 10E, and longitudinal members 14 are secured together by bolts 15 installed through matching holes, not shown. Locking pin assemblies 26 are provided to retain tubular members 16 to respective tubular members 12 as described above. Finally, box beam segments 41, 42, and 43 of cross-brace assembly 18E (FIG. 8) may be replaced by a single beam segment 19F. (FIG. 9).

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A An apparatus for attaching a jack to a lowermost longitudinal member of a trailer frame supporting a trailer body, comprising:

a first elongate horizontal member extending laterally outwardly of the frame, having an innermost edge; and a first attachment member, affixed to said innermost end of said horizontal member, said attachment member shaped to abut one of the longitudinal members of the frame and having bolt holes for attachment thereto through matching holes provided in the longitudinal member.

2. The apparatus of claim 1, wherein the horizontal member is a tube open at an outermost end thereof.

3. The apparatus of claim 1, wherein the attachment member comprises an attachment flange member which is generally flat being of generally rectangular cross-section.

4. The apparatus of claim 1, wherein the attachment member comprises an attachment angle member of generally L-shaped cross-section.

5. The apparatus of claim 1, further comprising:

a second elongate horizontal member with a second attachment member affixed thereto for attachment to another longitudinal member laterally opposite the first horizontal member; and a rigid cross-brace which extends between and which is affixed to the longitudinal members generally adjacent said horizontal members.

6. The apparatus of claim 5, wherein the cross-brace is integral with the horizontal members.

7. The apparatus of claim 6, wherein the horizontal members with cross-brace extends through the longitudinal members of the trailer frame such that the entire apparatus is above a generally horizontal plane defined by the bottom of the longitudinal members.

8. The apparatus of claim 5, wherein the attachment members comprise respective attachment angle members of generally L-shaped cross-section.

9. The apparatus of claim 8, wherein the cross-brace is integral with the horizontal members.

10. A The apparatus of claim 8, wherein the cross-brace comprises a single monolithic member opposite ends of which telescope with the respective horizontal members and which are permanently affixable thereto so as to fit various width frames.

11. The apparatus of claim 8, wherein the cross brace comprises three telescoping segments opposite ends of said cross-brace which telescope with the respective horizontal members and all of which are permanently affixable together after fitting to a particular frame so as to fit various width frames.

12. The apparatus of claim 8, wherein the horizontal members and the cross-brace are at least partially disposed below a generally horizontal plane defined by the bottom of the longitudinal members.

* * * * *